June 28, 1966 J. H. FRENCH 3,258,031
FLEXIBLE DRIVE CASING CONSTRUCTION AND MANUFACTURE
Filed Oct. 15, 1962
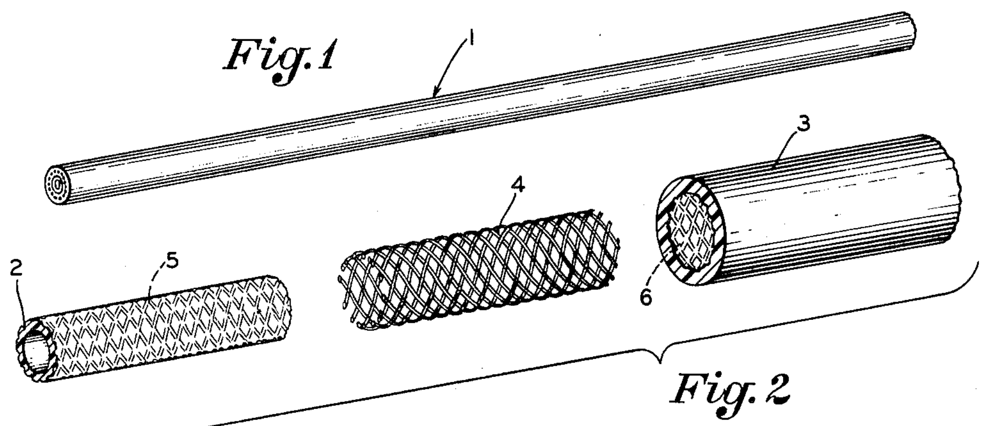
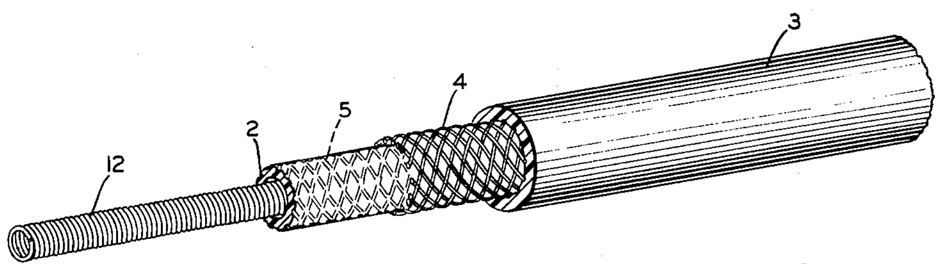
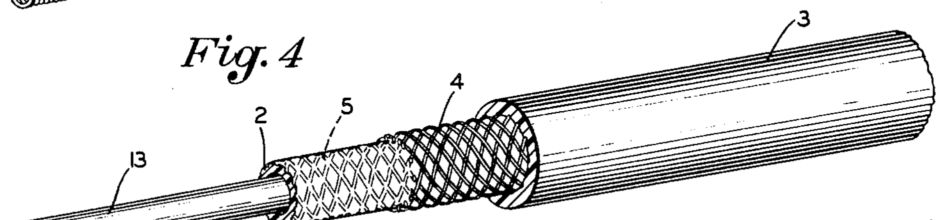
3
4
5
2
13
Fig. 5
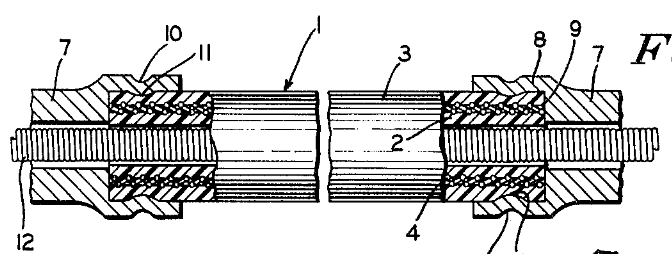
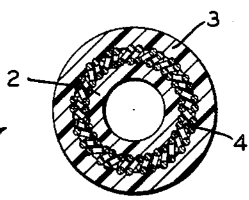
INVENTOR.
John H. French
BY
Frease, Bishop, Johns & Schick
ATTORNEYS 3,258,031
Patented June 28, 1966

3,258,031

FLEXIBLE DRIVE CASING CONSTRUCTION AND MANUFACTURE

John H. French, Canton, Ohio, assignor to Merit Molded Plastics, Inc., East Canton, Ohio, a corporation of Ohio Filed Oct. 15, 1962, Ser. No. 230,432
4 Claims. (Cl. 138—127)

The invention relates to flexible drives and more particularly to the manufacture and construction of casings for flexible drive cables such as a casing for a power transmission drive for the speedometer of a motor vehicle.

A typical flexible drive for a speedometer includes a flexible power transmitting core wire movable within a flexible casing. The flexible core wire ordinarily comprises an extended helical spring-like member having coupling means at each end for connection with the speedometer and the speedometer drive source. In operation, the core wire drive cable is housed in a casing ordinarily including a plastic inner liner tube within which the core wire rotates. A flexible metal sheath is slipped over the inner liner tube, and the sheath ordinarily is formed by a spirally-wrapped metal strip of special cross section. Sometimes a plastic cover tube is slipped over the flexible spirally-wrapped metal sheath. Thus, such casings have loose inner liner and cover tubes to permit the assembly of these casing components with the spiral metal sheath.

Also, at times the inner plastic tube is omitted. A lubricant is applied to the core wire between the core wire and inner liner or between the core wire and flexible spirally-wrapped metal sheath if the inner liner is omitted.

Such prior drive cable casing constructions present numerous difficulties, disadvantages and defects in manufacture and use. Thus, the inner plastic liner if used, the plastic cover tube and the flexible spirally-wrapped metal sheath are fabricated separately and are then assembled presenting assembly problems which are somewhat difficult and expensive. After assembly, the end fittings for the casing must be secured thereto which usually involves metal-to-metal contact between the fittings and the metal sheath and an inability to provide moisture-tight seals at the connection between the fittings and casing. As a result, moisture inevitably reaches and may attack the core wire. Further, the metal-to-metal joints between the fittings and casing provide favorable conditions for transmitting noise or sound incident to vibration or whipping of the drive cable in operation.

A further and major difficulty encountered in the use of the described prior construction is the resultant effect of kinking the casing. When the flexible spirally-wrapped metal sheath component of the casing is kinked by bending the casing too sharply, either in routing the casing from place to place during installation in a vehicle, or when vehicle repairs are being performed, or from other causes, the kinked portion of the metal sheath does not return to its original shape. This ordinarily, ultimately causes core wire failure at the kink location.

Furthermore, unless a lubricant is uniformly applied to and maintained during use of the core wire, and unless a moisture-tight seal can be maintained at the fittings to prevent moisture from reaching core wire surfaces within the casing, dry spots on the core wire ultimately occur which create noise and wear to the core wire. Such noise is objectionable and the wear may in some instances result in failure of the core wire.

In accordance with the invention these difficulties, defects and disadvantages of prior casing constructions for flexible drives are overcome or eliminated by a casing construction fundamentally involving an inner lubricant impregnated plastic liner member surrounded by a braided wire component which is in turn surrounded by an outer plastic cover or sheath. The wires of the braided wire component are imbedded at least partially in the outer surface of the inner plastic member and the inner surface of the outer sleeve, sheath or cover, thus providing an integral or unitary flexible casing construction.

The integration of the components of the improved casing construction eliminates the difficulties previously encountered with prior casings having a loose inner sleeve and a loose outer cover assembled to the spirally-wrapped metal sheath. Furthermore, the improved integrated casing construction can be cut to any desired length and end fittings secured thereto clamped over the outer surface of the outer plastic member producing a moisture-tight seal which prevents moisture from reaching the interior of the casing.

Typical fittings are formed of either metal or plastic material and when such fittings are secured to the improved casing construction, metal-to-plastic or plastic-to-plastic joints or seals are produced which act to dampen or lower the sound level of sound imparted to or transmitted along the casing.

The composition and dimensions of the inner and outer plastic members, and the wire size, temper and weave of the braided wire component may be altered to achieve a large range of physical properties, that is, flexibility, crush-strength, etc., for the integrated casing.

Furthermore, the improved integrated casing construction affords uniform flexibility in every direction and provides a casing that will not kink easily. The references to kinks and kinking herein relate to a deformation of the inner tubular member to such a degree that adequate clearance is absent for operation of the contained core wire after relief of the kinking force. From this standpoint, the improved casing substantially returns to original shape after kinking, at least to a degree such that a contained core wire can operate without failure due to the kinking.

As a result, the resistance to kinking and the return to original shape when kinked, which characterize the improved integrated casing construction, eliminate the cause of core wire failure which is the inevitable result of kinking of prior flexible metal sheath casing construction. The inherent flexibility and uniformity of flexing along the length of the improved integrated casing when bent in any direction, in addition to resisting kinking and returning to original shape when kinked, provide additional flexibility for the improved casing, so that routing of the casing with the core wire assembled therein is much easier in installing the casing in cars and trucks.

The enhanced and uniform flexibility of the improved integrated casing construction, as compared with prior metal sheathed casings which are stiffer and do not return to shape when kinked, allow the core wire to rotate within the casing without whipping that when present causes needle movement of a speedometer indicator. That is to say, the flexibility of the improved integrated casing takes up or absorbes any core wire whipping which tends to occur so that the same is not transmitted to or does not cause improper movement of the driven member such as the speedometer indicator.

The provision of a lubricant-impregnated plastic inner liner component for the improved integrated casing achieves several objectives. First, uniform lubrication and elimination of dry spots throughout the length and breadth of the casing, is obtained for the core wire. Second, the lubricant-impregnated inner liner continues to provide lubrication throughout the life of the casing. Third, the necessity of applying a special lubricant to the core wire when assembling the core wire in the casing and of uniformly covering the core wire with such special lubricant is eliminated. Although no lubricant is required in assembling and operating a core wire in the improved integrated casing, a light oil may be used in assembly if desired. The elimination of dry spots by the use of the lubricant-impregnated inner liner in turn eliminates noies and wear which may cause ultimate failure of the core wire in use.

Accordingly, it is a general object of the present invention to provide a new casing construction for flexible drives which overcomes or eliminates the difficulties, defects and disadvantages present or inherent in prior casing construction.

Moreover, it is an object of the present invention to provide a new integrated, lubricant-impregnated, wire braid reinforced, plastic casing for flexible drive cables.

Also, it is an object of the present invention to provide a new integrated flexible casing construction for flexible drives to which end fittings may be connected with a moisture-tight seal to prevent the entry of moisture into the interior of the casing and to damper transmision of sound through the casing.

Also, it is an object of the present invention to provide a new integrated flexible casing construction for flexible drives in which the physical properties of the casing as to flexibility, crush-strength, etc., may be varied over wide ranges.

Likewise, it is an object of the present invention to provide a new integrated flexible casing construction for flexible drives with enhanced and uniform flexibility, resistant to kinking and characterized by returning to original shape when kinked.

Also, it is an object of the present invention to provide a new integrated flexible casing construction for flexible drives which may be routed easier when installing the flexible drive in a motor vehicle.

Moreover, it is an object of the present invention to provide a new integrated flexible casing construction for flexible drives which allows the core wire in the casing to rotate without whipping that causes improper speedometer needle movement in prior constructions.

Furthermore, it is an object of the present invention to provide a new integrated flexible cable construction for flexible drives which eliminates lubrication problems, noise, core wire wear and failure which characterize prior constructions.

Finally, it is an object of the present invention to provide a new integrated flexible casing construction for flexible drives and a new method of making the same which solve existing problems in the art, eliminate the difficulties described, and obtain the foregoing advantages and desiderata in a simple and effective manner.

These and other objects and advantages apparent to those skilled in the art from the following description and claims, may be obtained, the stated results achieved, and the described difficulties overcome by the methods, steps, procedures, constructions, arrangements and devices which comprise the present invention, the nature of which are set forth in the following general statements, preferred embodiments of which—illustrative of the best modes in which applicant has contemplated applying the principles—are set forth in the following description and shown in the drawings, and which are particularly and distinctly pointed out and set forth in the appended claims forming part hereof.

The nature of the improved integrated flexible casing construction for flexible drives of the present invention may be stated in general terms as preferably including an inner, plastic, tubular, lubricant-impregnated liner member, a braided wire reinforcing sheath surrounding the inner liner member with portions at least of the wires forming the braided wire partially imbedded in the outer surface of the inner plastic member, an outer tubular plastic cover member surrounding the braided wire reinforcing sheath with portions at least of the wires forming the braided wire partially imbedded in the inner surface of the outer cover member, and the inner and outer plastic members with the intervening imbedded braided wire reinforcing sheath forming an integrated casing.

The nature of the improvements in method of making flexible casings for flexible drives of the present invention may be stated in general terms as preferably including forming a tublar inner casing member of thermoplastic material impregnated with a lubricant, braiding a braided wire tubular reinforcing sheath around the exterior surface of the inner member with sufficient tension to at least partially imbed portions of the braiding wires in the exterior surface of the inner member, forming an outer tubular cover of thermoplastic material around the braided wire reinforced inner member, preferably by extruding, with sufficient pressure so that portions at least of the braided wires are partially imbedded in the inner surface of the outer cover member, and preferably continuously carrying out the inner member forming, wire braiding and outer cover forming operations.

By way of example, preferred embodiments of the improved construction are illustrated in the accompanying drawing forming a part hereof wherein:

FIGURE 1 is a perspective view of the improved integrated flexible casing construction;

FIG. 2 is an exploded perspective view of fragmentary portions of the components of the improved integrated casing construction;

FIG. 3 is a view similar to FIG. 2 illustrating the improved integrated construction;

FIG. 4 is a view similar to FIG. 3 but showing a helical spring-type drive cable core wire assembled in the improved casing;

FIG. 5 is a view similar to FIG. 4 but showing a push-pull drive member core wire assembled in the improved casing;

FIG. 6 is a side elevation with parts broken away and in section of the terminal ends of a length of improved casing with end fittings secured thereto providing moisture-tight seals; and FIG. 7 is an enlarged fragmentary sectional view taken on the line 7—7, FIG. 3 illustrating the manner in which the braided wire reinforcing sheath is imbedded in the inner and cover members.

Similar numerals refer to similar parts throughout the various figures of the drawing.

The improved integrated flexible casing construction is indicated generally at 1 and includes an inner plastic liner member or lamination 2, an outer tubular plastic cover member or lamination 3, and an intervening braided wire reinforcing sheath 4 imbedded at least partially in each of the liner and cover laminations substantially throughout the length of the sheath, as shown.

In accordance with the invention, the inner, plastic, tubular liner member 2 is lubricant-impregnated, and may be formed of an elastomeric or rigid, thermoplastic, plastic material such as nylon, linear polyethylene, polypropylene, vinyl resin, acetal resin or polyurethane. These materials may be compounded so that with a selected wall thickness for the tubular member 2, the desired flexibility and crush-strength can be obtained. The lubricant with which the plastic material of member 2 may be impregnated may be selected from the group consisting of graphite and molydisulphide. The lubricant may be mixed with the thermoplastic material in powdered form before molding or extruding the tubular sleeve 2 under the required conditions of heat and pressure.

The plastic, lubricant-impregnated, inner liner member 2 is preferably continuously extruded in the usual manner from the desired plastic-lubricant composition, thereby necessarily resulting in the single lamination liner as shown.

The braided wire sheath 4 is then continuously braided telescoped over and around the liner member 2 with sufficient tension that the wire components are at least partially imbedded in the outer surface of the member 2 as indicated by the broken lines 5 in the drawing. The braided wire sheath 4 may be a one-end, a two-end or a multiple-end braided wire, depending upon the degree of strength desired, and the braiding operation may be carried out on a typical braiding machine, either as a separate operation, or in a continuous production line of equipment immediately following the extruder for the inner liner 2, in any case resulting in the single layer braided sheath as shown.

The liner 2 with the braided wire sheath 4 thereon is then covered with the plastic cover 3. The cover 3 may be formed of any of the elastomeric or rigid, thermosplastic, plastic materials indicated as suitable for the inner liner, omitting the lubricant which is not required in the cover material. The cover 3, like the inner liner 2, may be continuously extruded in the usual manner under the required conditions of heat and pressure, telescoped over and around the sheath reinforced inner liner 2 in an extruder, either as a separate operation, or in the continuous production line immediately following the braiding machine, thereby necessarily resulting in the the single lamination cover as shown. Sufficient pressure is exerted in forming the cover 3 that the metal wire components of the braided wire sheath 4 are at least partially imbedded in the inner surface of the cover 3 as indicated by the broken lines 6 (FIG. 2) of the drawing.

The compounding of the plastic material from which the cover member 3 is formed as well as the wall thickness thereof may be selected to obtain the desired degree of flexibility. Thus, the new casing 1 may have any combination of physical properties desired for any particular application or use.

The braided wire sheath 4 has the inherent capacity of bending about a uniform radius whenever bent from any angle. This characteristic along with the characteristic of the thermoplastic materials from which the liner 2 and cover 3 are formed, to return to original shape, when bent, combine to provide a casing 1 which resists kinking when bent sharply and which does not take a permanent kink-set but returns substantially to original shape preventing faiulure from kinking of any core wire contained within the casing 1.

The improved integrated, flexible casing construction 1 continuously formed in the manner described may be cut to the required length for any desired use and coupling or fitting members 7 may be secured to the ends of a cut length as indicated in FIG. 6. The fittings 7 may be formed of metal or plastic meterial with a sleeve portion 8 shouldered at 9 telescoped over the end portion of the casing 1. The sleeve portion 8 of the fitting 7 is crimped or beaded inward as indicated at 10 to form an inwardly projecting annular rib 11 compressed inward into the plastic cover member 3 forming a moisture-tight seal between the fitting and the casing.

Where the fittings 7 are formed of metal, a metal-to-plastic joint is formed between the fittings 7 and casing 1 which acts to dampen the transmission of sound, or lower the sound level of any sound transmitted, to or through the casing. If the fittings 7 are formed of plastic material, the crimped joint between the fittings 7 and casing 1 may be a heat-sealed or fused joint. With plastic fittings 7, a plastic-to-plastic joint is formed between the fittings 7 and casing 1 which similarly dampens any transmission of sound through the casing or fittings.

The improved flexible casing 1 produced in the manner described has a resultant integral or integrated unitary construction comprising the inner plastic lubricant-impregnated liner 2, the outer plastic cover 3 and the intervening braided wire reinforcing sheath 4 imbedded partially in the liner 2 and cover 3. This integrated casing 1 in use can be bent uniformly around extremely sharp radii in any direction without kinking, so that the casing may be very readily routed through assembly paths in a motor vehicle or other device in which the casing is used. Although the casing 1 resists a tendency to kink, if it is subjected to an extreme force producing kinking, it will return to shape after the kinking force has been removed. Thus, no permanent kinks result to such degree as can cause failure of a core wire passing through the casing.

A core wire drive cable 12 (FIGS. 4 and 6) may be passed through a section of the improved casing 1 either before or after the fittings 7 are assembled to the ends of a casing section. The core wire drive cable may be either a typical helical spring-like member 12 as illustrated which rotates to transmit a drive; or the core wire may be a solid flexible wire 13 of the push-pull type illustrated in FIG. 5. In either event, substantially friction-free movement of the core wire 12 or 13 within the casing with minimum noise and wear can occur, because of the lubrication of the surface of the core wire 11 or 12 which contact with the interior of the liner 2, by the lubricant present in the inner liner 2.

The inherent flexibility of the plastic materials from which the liner 2 and cover 3 are formed provides casing flexibility allowing the core wire 12 to rotate within the casing without whipping. Such whipping frequently causes improper needle movement of a speedometer indicator if present.

The improved casing construction may be used for the flexible drives for devices other than speedometers. In some applications, such as in a flexible drive extending to or along the boom of a power shovel or crane, it may be desirable to eliminate metal from the braided reinforcing sheath 4 to eliminate an electrical conductor in the casing in event that high voltage electrical power transmission lines are accidentally contacted by the casing. In such instances the wire braid may be replaced by a braided sheath formed of fibre glass strands or strands of organic, electrically non-conductive material, such as nylon, Delrin (acetal), polycarbonate or polypropylene strands.

Accordingly, the present invention provides a flexible, integrated, lubricant-impregnated, braided-sheath-reinforced, plastic casing for flexible drive cables which eliminates the spirally-wrapped metal sheath component of prior casing constructions that causes the described difficulties, disadvantages and defects heretofore encountered in the use of flexible drive casings; provides a flexible, integrated casing for flexible drive cables in which telescopic assembly of casing component is eliminated, which inherently requires looseness to accomplish telescoping between the telescoped component that characterize prior casing constructions and which can cause casing or core wire failure; provides a flexible, integrated casing for flexible drive cables which achieves the objectives and new results described; and provides a new integrated, flexible casing construction and new method of making the same solving existing problems and obtaining the stated advantages in a simple and effective manner.

In the foregoing description, certain terms have been used for brevity, clearness and understanding but no unnecessary limitations are to be implied therefrom beyond the requirements of the prior art, because such words are used for description purposes herein and are intended to be broadly construed.

Moreover, the embodiments of the improved construction and method illustrated and described herein are by way of example, and the scope of the invention is not limited to the exact details, sizes, etc., shown.

Having now described the features, constructions and principles of the invention, the characteristics of the improved construction, the steps of manufacture, and the advantageous, new and useful results provided; the new and useful discoveries, principles, parts, elements, constructions, arrangements, and steps, and mechanical equivalents obvious to those skilled in the art are set forth in the appended claims.

I claim:

1. Integrated, flexible, casing construction for flexible drive cables consisting of a single inner, tubular, thermoplastic, plastic material liner lamination formed of a plastic material selected from the group consisting of elastomeric and rigid, thermoplastic, plastic materials; a single outer, tubular, thermoplastic, plastic material cover lamination telescoped over the liner lamination and formed of a plastic material selected from the group consisting of elastomeric and rigid, thermoplastic, plastic materials; a single layer, tubular, braided-strand, reinforcing sheath telescoped within the cover lamination and telescoped over and surrounding the liner lamination; and portions at least of the strands of the braided sheath being partially imbedded in each of the liner laminations plastic material and cover lamination plastic material substantially throughout the length of the braided sheath, whereby the integrated casing is kink-resistant and returns substantially to original shape after relief from kinking forces to which it may be subjected.

2. The casing construction defined in claim 1 in which the single plastic material liner lamination is lubricant-impregnated.

3. The casing construction defined in claim 1 in which the single layer braided reinforcing sheath is formed of braided wire.

4. Integrated, flexible, casing construction for flexible drive cables consisting of a single inner, tubular, thermoplastic, lubricant-impregnated plastic material liner lamination formed of a plastic material selected from the group consisting of elastomeric and rigid, thermoplastic, plastic materials; a single outer, tubular, thermoplastic, plastic material cover lamination telescoped over the liner lamination and formed of a plastic material selected from the group consisting of elastomeric and rigid, thermoplastic, plastic materials; a single layer, tubular braided wire reinforcing sheath telescoped within the cover lamination and telescoped over and surrounding the liner lamination; and portions at least of the wires of the braided wire sheath being partially imbedded in each of the liner lamination plastic material and cover lamination plastic material substantially throughout the length of the braided wire sheath, whereby the integrated casing is kink-resistant and returns substantially to original shape after relief from kinking forces to which it may be subjected.

References Cited by the Examiner

UNITED STATES PATENTS

| | | | |
|---|---|---|---|
| 2,463,293 | 3/1949 | Mentel | 138—127 X |
| 2,518,892 | 8/1950 | Hollingsworth | 138—127 |
| 2,577,049 | 12/1951 | Uline | 138—127 X |
| 2,730,133 | 1/1956 | Bowyer et al. | 138—127 |
| 2,821,092 | 1/1958 | Cordora et al. | |
| 3,030,253 | 4/1962 | St. John et al. | |
| 3,049,762 | 8/1962 | Jackson. | |
| 3,100,136 | 8/1963 | D'Ascoli et al. | |

OTHER REFERENCES

J. Delmonte: Plastic in Engineering, published by Penton Publishing Co., Cleveland, Ohio, 1940, TP–986–A2–D35.

LAVERNE D. GEIGER, *Primary Examiner.*

ALEXANDER H. BRODMERKEL, LEWIS J. LENNY, *Examiners.*

F. MARLOWE, *Assistant Examiners.*